United States Patent
Rey et al.

(10) Patent No.: US 9,643,776 B2
(45) Date of Patent: May 9, 2017

(54) DEVICE FOR CONVEYING A FINE-PARTICLE MEDIUM

(71) Applicant: Robatech AG, Muri (CH)

(72) Inventors: Kurt Rey, Boswil (CH); Felix Huembeli, Muri (CH); Christoph Kaeppeli, Merenschwand (CH)

(73) Assignee: ROBATECH AG (CH)

( * ) Notice: Subject to any disclaimer, the term of this patent is extended or adjusted under 35 U.S.C. 154(b) by 0 days.

(21) Appl. No.: 14/693,874

(22) Filed: Apr. 23, 2015

(65) Prior Publication Data

US 2015/0307271 A1    Oct. 29, 2015

(30) Foreign Application Priority Data

Apr. 24, 2014  (EP) .................................... 14165715

(51) Int. Cl.
*B65G 53/40*   (2006.01)
*B65D 88/54*   (2006.01)
(Continued)

(52) U.S. Cl.
CPC .......... *B65D 88/548* (2013.01); *B05B 7/1445* (2013.01); *B05B 7/1472* (2013.01);
(Continued)

(58) Field of Classification Search
CPC ...... B65D 88/548; B65G 65/40; B65G 53/42; B05B 7/1445; B05B 7/1472; B05C 11/1042
(Continued)

(56) References Cited

U.S. PATENT DOCUMENTS 2,829,803 A   4/1958  Paton
3,584,919 A * 6/1971  Canonico ............... B29D 30/04
                                                        406/134
(Continued)

FOREIGN PATENT DOCUMENTS

DE       4021674 A1    1/1992
DE       4315327 A1   11/1994
(Continued)

OTHER PUBLICATIONS

European Patent Office, Search Report for Application No. 14165715.5-1707, Oct. 9, 2014, 6 pages (German Language).
(Continued)

*Primary Examiner* — William R Harp
(74) *Attorney, Agent, or Firm* — Christopher C. Dremann, P.C.; Christopher C. Dremann

(57) ABSTRACT

The invention relates to a device for conveying a fine-particle medium, in particular a granulate, including a flexible receptacle for receiving the medium, a receiving fixture for fastening of the receptacle in the region of an upper end facing away from a base of the receptacle, and a suction apparatus, inserted from above into the receptacle, for sucking the medium out of the receptacle. The device further includes outside the receptacle, in its base region or its lateral region, an apparatus for acting on the receptacle for the purpose of its deformation. The device ensures that feed interruptions during the conveyance of the fine-particle medium are avoided so that the medium is kept in a conveyable state, whereby an undisturbed automated feed of the medium is secured.

13 Claims, 2 Drawing Sheets

(51) Int. Cl.
  *B05B 7/14* (2006.01)
  *B65G 53/42* (2006.01)
  *B65G 65/40* (2006.01)
  *B05C 11/10* (2006.01)
(52) U.S. Cl.
  CPC ............ *B65G 53/42* (2013.01); *B65G 65/40*
    (2013.01); *B05C 11/1042* (2013.01)
(58) Field of Classification Search
  USPC .......................................... 406/73, 134, 141
  See application file for complete search history.

(56) References Cited

U.S. PATENT DOCUMENTS

| | | | | |
|---|---|---|---|---|
| 5,271,695 A * | 12/1993 | Bischof | ................ | B05B 7/1445 406/114 |
| 5,382,117 A * | 1/1995 | Rings | ..................... | A47L 15/44 222/105 |
| 5,944,455 A * | 8/1999 | Wilhelm | ............. | B65B 69/0075 406/141 |
| 6,036,408 A * | 3/2000 | Wilhelm | ............. | B65B 69/0075 406/113 |
| 6,398,462 B1 | 6/2002 | Fulkerson | | |
| 6,843,283 B2 * | 1/2005 | Dietrich | ............. | B65B 69/0091 141/10 |
| 7,963,728 B2 * | 6/2011 | Henderleiter, Sr. | ... | B05B 7/1404 406/114 |
| 2008/0191437 A1 | 8/2008 | Staub | | |

FOREIGN PATENT DOCUMENTS

| | | |
|---|---|---|
| DE | 4407684 C1 | 6/1995 |
| DE | 102005016352 A1 | 10/2006 |
| DE | 202010006010 U1 | 8/2010 |
| EP | 0962258 A1 | 12/1999 |
| EP | 1544132 A2 | 6/2005 |
| EP | 2612817 A1 | 7/2013 |

OTHER PUBLICATIONS

English Language Translation of European Patent Office Search Report for Application No. 14165715.5-1707, Oct. 9, 2014, 4 pages (corresponding to pp. 4-6 of L).

* cited by examiner

DEVICE FOR CONVEYING A FINE-PARTICLE MEDIUM

CROSS REFERENCE TO RELATED APPLICATION

This application claims the benefit of foreign priority to European Patent Application No. EP 14 165 715.5 entitled "Einrichtung zum Fördern eines feinteiligen Mediums" filed on Apr. 24, 2014, the entire disclosure of which is incorporated herein by reference.

FIELD OF THE INVENTION

The invention relates to a device for conveying a fine-particle medium, in particular a granulate, comprising a flexible receptacle for receiving the medium, a receiving fixture for fastening of the flexible receptacle in the region of an upper end facing away from a base of the flexible receptacle, and a suction apparatus, inserted from above into the flexible receptacle, for sucking the medium out of the flexible receptacle.

BACKGROUND OF THE INVENTION AND RELATED ART

Devices for conveying a fine-particle medium, for instance a medium which is in the form of a granulate or in powder form, are well known from the prior art.

A market-standard form of delivery of hotmelt for packaging applications is granulate. This can be fed from a receptacle to a further processing unit, for instance a melting unit. Granulates of such a type are inclined to wedge in a storage tank or intermediate storage tank, to clog, to form cavities or, depending on their chemical formulation, to stick together or bond together. Consequently, the onward feed of the granulate into a connected further processing unit is interrupted or disturbed.

A device of the type stated in the introduction is known from DE 20 2010 006 010 U1. This has a suction apparatus, disposed within the flexible receptacle, with vibration unit. The vibration unit consists of a plurality of vibration elements. These achieve a loosening effect, in the region of the vibration unit, of the medium received by the receptacle. According to a first variant, the vibration unit is disposed only in a central region of the receptacle and is therefore of compact and structurally relatively simple design. As a result of this configuration and arrangement of the vibration unit, clogging of the medium in the region of the side walls of the receptacle cannot be prevented. According to a second variant, it is provided that the vibration unit extends over the entire cross section of the receptacle. Since the vibration unit reaches to the side walls of the receptacle, this design prevents clogging to be attained over the entire cross section of the receptacle. However, the structural complexity for the vibration unit is very high. Because of its size, moreover, the vibration unit has a high weight, so that the total mass of the mobile suction apparatus with vibration unit is very high.

In EP 2 612 817 A1, a flexible receptacle having a material discharge funnel disposed in the region of the base of the receptacle is known. The funnel is provided with lateral receiving apparatuses for transmitting a vibration generated outside the funnel into the interior of the receptacle. The material of the funnel is selected such that a phase shift or amplitude shift between internal and external vibration is achieved, which shift prevents clogging/adhesion of the fine-particle medium on/to the funnel.

In EP 1 544 132 A2, a receptacle for receiving pellets or similarly sized items is described, wherein the storage receptacle is provided with movable, plate-like side walls. Through mechanical adjustment of the pitch of the side walls by means of a winch and the therewith associated volume reduction of the storage receptacle, the material delivery into a discharge apparatus, for example a worm, is ensured. During emptying of the receptacle prior to refilling, the receptacle volume must be mechanically enlarged again by resetting of the side walls.

From U.S. Pat. No. 2,829,803, a receptacle having mechanically adjustable side walls is likewise known.

OBJECT AND SUMMARY OF THE INVENTION

The object of the present invention is to refine a device of the type stated in the introduction such that an undisturbed automated feed of the fine-particle medium is secured, thus feed interruptions are avoided and the medium is kept in a conveyable state. Moreover, the device is intended to be of a structurally particularly simple design.

The object is achieved by virtue of the fact that, outside the flexible receptacle, in its base region or its lateral region, is arranged an apparatus for acting on the flexible receptacle for the purpose of its deformation.

In the device according to the invention, it is of fundamental importance that the fine-particle medium present in the flexible receptacle, in particular the granulate present in the flexible receptacle, is sucked upward out of the flexible receptacle by means of the suction apparatus inserted in the flexible receptacle. The problem thus arises that, in particular the medium present in the lower region, thus in the region of the base, and in the region of the side walls of the flexible receptacle, due to the weight of the medium present in the filled flexible receptacle, wedges, clogs, forms cavities, or, moreover, depending on the chemical formulation, sticks together or bonds together. Also in this lower region of the flexible receptacle and in the region of its side walls, it is necessary to ensure that the conveyable state of the medium is maintained so as to enable this to be sucked upward out of the flexible receptacle by means of the suction apparatus. The problem thus appears differently than that in a receptacle which has in the base region a discharge opening for the medium. The fact that, according to the invention, the apparatus for acting on the flexible receptacle for the purpose of its deformation is disposed outside the flexible receptacle, and this apparatus acts on the flexible receptacle in the base region or the lateral region of thereof, means that the fine-particle medium can be kept in the conveyable state in an extremely simple manner and, furthermore, with minimal structural complexity. To this end, it is merely necessary to act on the flexible receptacle by means of the apparatus at certain intervals, whereby the apparatus deforms the receptacle and thus acts on the medium, so that no wedging, clogging or sticking/bonding together can occur, nor can cavities be formed within the medium.

Preferably, the apparatus for acting on the flexible receptacle has a means for periodically acting on the receptacle.

Preferably, the apparatus for acting on the flexible receptacle has a means for acting percussively on this receptacle, or a means for moving the base of the receptacle. In particular, it is provided that the means moves back and forth together with the base of the flexible receptacle. The movement is made with an acceleration which, when a top or bottom dead center of the means is reached, causes the material structure of the medium contained in the flexible receptacle to be abruptly altered.

The flexible receptacle consists, in particular, of a fabric, cloth, plastic, or some other flexible material. It is here important for the receptacle to be flexible in order that it deforms when acted on by means of the apparatus. The change of shape of the receptacle results in the settled, wedged, bonded, clogged fine-particle medium, in particular granulate, which can no longer, or only with difficulty, be conveyed, being loosened again. Preferably, the means for acting on the flexible receptacle moves back and forth together with the base of the receptacle, whereby the change in position of the means for acting on the receptacle proceeds simultaneously with the change in position of the receptacle in its base region, since the means and the receptacle are in constant contact. As a result of either the bottom or top dead center of the means having abruptly been reached, the medium present in the flexible receptacle is likewise abruptly stopped and thus the material structure or the bridging of the medium is altered. As a result of the occurring sudden mass stoppage of the flexible receptacle and the medium present therein, the material structure of the medium is altered such that the medium is set into a free-flowing state or this state is maintained. After this, the medium is conveyed out of the receptacle, in an upwardly directed material flow direction, by means of the suction apparatus.

According to a preferred refinement of the invention, it is provided that the apparatus for acting on the flexible receptacle has a lifting unit and the means which is movable back and forth from this and is configured as a plate, wherein the plate can be brought into contact with the base of the receptacle or the receptacle rests on the plate. As a result of this configuration, an impact force can be transmitted to the receptacle over a large area.

In particular, it is provided that the apparatus for acting on the receptacle is disposed beneath the flexible receptacle. This produces a favorable force application point of the apparatus for acting on the receptacle, such that, as a result of this, an impact force can be applied to the receptacle in the vertical direction. Furthermore, the arrangement of the apparatus for acting on the receptacle beneath the receptacle enables a compact overall layout.

The flexible receptacle is preferably secured, in the region of its upper end, in the receiving fixture. The fastened receptacle is thus fixed in the region of its upper end, whereby the receptacle, when a force acts on the base from below, is not raised in its entirety.

According to a preferred refinement of the invention, it is provided that the device for conveying the fine-particle medium has a stable container, which receives the receptacle in its interior. In particular, the container is configured in the style or form of a commercially available waste receptacle with container bottom part and container lid mounted pivotally in said container bottom part. Such a waste receptacle is, in particular, a waste receptacle as used in households, which has a capacity, for instance, of 240 liters. In the style of such a waste receptacle, the container has, for instance, two wheels for transport of the container in its slightly tilted position. The container is of substantially cuboid design, with upper opening and the container lid for closing this opening in the container bottom part.

Preferably, the receptacle is clamped, in the region of its upper end, between the container bottom part and the container lid fixedly connected thereto. Since the container, concretely the container bottom part, is firmly closed by means of the container lid, lifting of the flexible receptacle out of the container by means of the apparatus for acting on the receptacle or by means of the lifting unit is in this way prevented. The container lid thus forms a type of stop or fixed point for the flexible receptacle, whereby the container lid compels a change of shape of the flexible receptacle in the upper side region as a result of the lifting movement. This stop ensures the reliable desired change of shape of the receptacle.

Preferably, the apparatus for acting on the receptacle within the container is thus disposed beneath the receptacle. Thus a particularly compact design of flexible receptacle and apparatus for acting on the receptacle, in association with the container receiving these components, can be obtained.

The flexible receptacle is in total or in part, at least in the region of side walls of the receptacle, flexibly configured.

In one embodiment, the flexible receptacle is preferably of the kind in which the fine-particle medium is delivered.

The container preferably consists of plastic or metal. In principle, different cross-sectional shapes of container and/or flexible receptacle can be used, for instance a round or oval cross-sectional shape.

The apparatus for acting on the flexible receptacle or the lifting unit can be driven in different manner, in particular pneumatically, electrically, hydraulically. The movement thereof can be vertical, from below, or horizontally, from the side, thus lateral impacting on the flexible receptacle. Of particular advantage is a shaking movement on the flexible receptacle. The lifting unit can contain a lifting plate apparatus consisting of a plurality of segments which rise and fall simultaneously or at intervals. The plate of the lifting unit and the base of the flexible receptacle can permanently touch, or have at least in part a different acceleration. Consequently, the plate impacts on the receptacle or the receptacle falls onto the plate.

In the configuration of the container with the container lid, it is in particular provided that the container lid has an opening which passes through a lance of the suction apparatus. Since the fill state of the flexible receptacle changes with increasing emptying, it is provided that the suction apparatus follows the fill state of the receptacle. From this point of view, the suction apparatus or the lance of the suction apparatus passes, axially guided, through the container lid. This guidance enables a motional play of the suction apparatus or of the suction lance within a defined range and prevents catching of the suction apparatus or of the suction lance on the container lid. Such catching would result in the suction apparatus or the suction lance being unable to suck up any medium due to the suction apparatus or the suction lance hanging in the air.

BRIEF DESCRIPTION OF THE DRAWING FIGURES

In the drawing figures, the invention is represented with reference to a preferred illustrative embodiment without being restricted thereto, wherein like reference characters refer to the same or similar parts, items, assemblies or subassemblies in the various views.

DETAILED DESCRIPTION OF THE INVENTION

Figure 1:
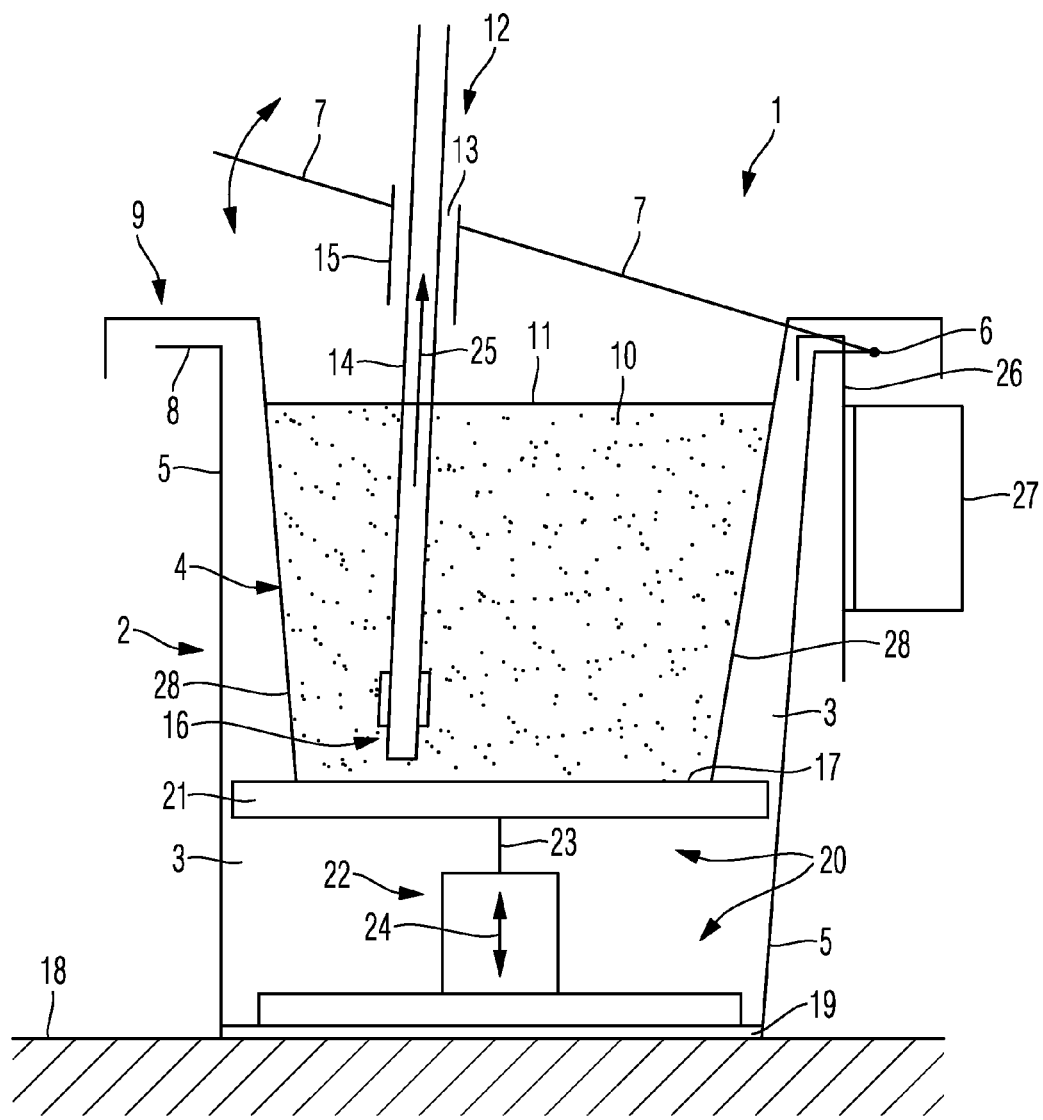
FIG. 1 shows a vertical section through a device for conveying a fine-particle medium, with a filled flexible receptacle, according to an exemplary embodiment of the present invention.

The device, illustrated in FIG. 1, for conveying the fine-particle medium is denoted generically by the reference numeral 1. This fine-particle medium is in the form, for instance, of a granulate, which is to be fed to a further processing unit, for instance a melting unit. The market-standard form of delivery for hotmelt for packaging applications is granulate.

The device 1 has a stable container 2, which receives in its interior 3 a flexible receptacle 4 which likewise forming a component part of the device 1. The container 2 is configured in the style of a commercially available waste receptacle having a capacity of 240 liters and hence has a container bottom part 5 and a container lid 7 mounted pivotally therein about an axis 6. The container 2 consists of plastic and is of largely thin-walled configuration. The internal cross section of the container bottom part 5, thus the cross section of the interior 3, is square.

The flexible receptacle 4 consists, for instance, of a fabric and is thus flexible in its entirety. In the region of the upper end, the receptacle 4 is suspended. In this respect, the container bottom part 5 has in the region of its upper end a circumferential horizontal portion 8, by which the receptacle 4 is suspended with its upper rim 9, which rim is directed downward in a U-shape. For reasons of clarity, the rim 9 is not resting on the portion 8, but is illustrated arranged at a distance above this. In reality, the receptacle 4 rests in the region of the U-shaped rim 9 on the portion 8 of the container bottom part 5.

The flexible receptacle 4 is filled with the fine-particle medium 10, in the present case granulate. The fill level of the granulate 10 is illustrated with the reference numeral 11. Accordingly, the receptacle 4 is almost completely filled.

Into the flexible receptacle 4, which is open at the top, a suction apparatus 12 is inserted from above. The container lid 7 has an opening 13, which passes through a lance 14 of the suction apparatus 12, wherein this lance 14 is axially guided by means of a guide 15 mounted in the container lid 7. The lance 14, in the region of which is arranged a suction opening 16 for the medium 10, is inserted in the receptacle 4 to the point where the lance 14 is disposed adjacent to a base 17 of the receptacle 4.

During operation of the device 1, contrary to the representation in FIG. 1, the container lid 7 is disposed in its closed position, whereby it is horizontally positioned and rests on the rim 9 of the container bottom part 5. In this position, the container lid 7 is locked in place on the container bottom part 5, so that the container lid 7 cannot be inadvertently opened. Between the container lid 7 and the container bottom part 5, the flexible receptacle 4 is clamped in the region of its rim 9, and thus secured.

The container 2 rests on a ground surface or on a standing surface 18. The container bottom part 5, for its part, has a base 19. On this is arranged an apparatus 20 for acting on the receptacle 4 for the purpose of its deformation. The apparatus 20 can be fastened to the base 19. The apparatus 20 has a means 21, configured as a rigid plate, for acting on the receptacle 4. The plate 21 here has a cross section parallel to the base 19 of the container bottom part 5 which is slightly smaller than the cross section of the container bottom part 5. The apparatus 20 further has a lifting unit 22, mounted in the base 19 of the container bottom part 5, for lifting and lowering the plate 21. A lifting rod 23 of the lifting unit 22 is here fixedly connected to the plate 21. The lifting motional directions of the lifting rod 23, and thus of the plate 21, are illustrated by the double arrow 24.

The arrow 25 illustrates the direction of conveyance of the medium or granulate 10 through the lance 14.

In the container bottom part 5 is hung, in the region of the portion 8, a receiving apparatus 26, which serves for the mounting of a control unit 27.

When the flexible receptacle 4, in particular a receptacle 4 filled with medium or granulate 10, is inserted in the container 2, the base 17 of the receptacle 4 rests on the plate 21 of the apparatus 20 for acting on the receptacle 4. The length of the flexible receptacle 4 in the flow direction of the medium is here greater than the distance between the top edge of the plate 21 and the portion 8. If the plate 21 is raised from the lowered position illustrated in FIG. 1, this leads to a deformation of the receptacle 4 in the region of its side walls 28, and thus of the medium or granulate 10 received by the receptacle 4. Should the medium present in the receptacle 4 have become wedged or clogged, or stick together or bond together, depending on its chemical formulation, this wedging, clogging, sticking or bonding together can be dispelled by repeated lifting and lowering of the plate 21, and thus repeated action of the plate 21 on the receptacle 4, as a result of its repeated variable deformation of the receptacle 4, so that the medium or granulate 10 in the free-flowing state is sucked out of the receptacle 4 by means of the suction apparatus 12 and can be fed in an automated and uninterrupted manner to a further processing unit.

Instead of the direct contact of plate 21 and flexible receptacle 4, whereby the base 17 of the receptacle moves periodically with the plate 21, it can well be provided that the lifting unit 22 impacts obliquely from below periodically against the receptacle 4. In principle, in the deformation of the receptacle 4, owing to the flexibility of the receptacle 4, and due to the change of position of the plate 21 between its lower and upper lifting position, at least a section of the side walls 28 of the flexible receptacle 4 is mechanically deformed. The change of shape of the receptacle 4 results in the settled, wedged, bonded, clogged granulate, which can no longer, or only with difficulty, be conveyed, being loosened again. This desired effect is obtained in that the lifting unit, in one embodiment, lowers itself faster than the flexible receptacle, with the granulate 10 present therein, can fall back into the bottommost position under its own inertia. Another embodiment describes the change of position of the plate 21, which proceeds simultaneously with the change of position of the base 17 of the flexible receptacle 4, since these are in constant contact. As a result of either the bottom or top dead center having abruptly been reached, the granulate 10 present in the receptacle 4 is likewise abruptly stopped and thus the material structure or the bridging of the granulate 10 is altered. As a result of the, in both cases, sudden mass stoppage of the receptacle 4 and the granulate 10 present therein, the material structure of the granulate 10 or of the bulk material is altered such that the granulate is set into a free-flowing state or this state is maintained. After this, the granulate 10 is conveyed out of the receptacle 4, in an upwardly directed material flow direction 25, by means of the suction lance 14.

Since the primarily vertical movement of the plate 21 transmits a primarily vertical movement to the lance 14, the guide 15 for the lance 14 is provided on the closed container lid 7. This guide 15 enables a motional play within a defined range and prevents catching of the lance 14, inter alia, on the container lid 7. This catching, in turn, would result in the lance 14 being unable to suck up any granulate 10 due to the intake part of the suction lance 14 hanging in the air. Since the container 2 is closed by means of the container lid 7, lifting of the receptacle 4 out of the container 2 by means of the lifting unit 22 is prevented. The container lid 7 thus forms a type of stop or fixed point for the flexible receptacle 4, which compels a change of shape of the flexible receptacle 4 in the upper side region as a result of the lifting movement. As a result of this stop, a particularly reliable, desired change of shape of the receptacle 4 is ensured.

Figure 2:
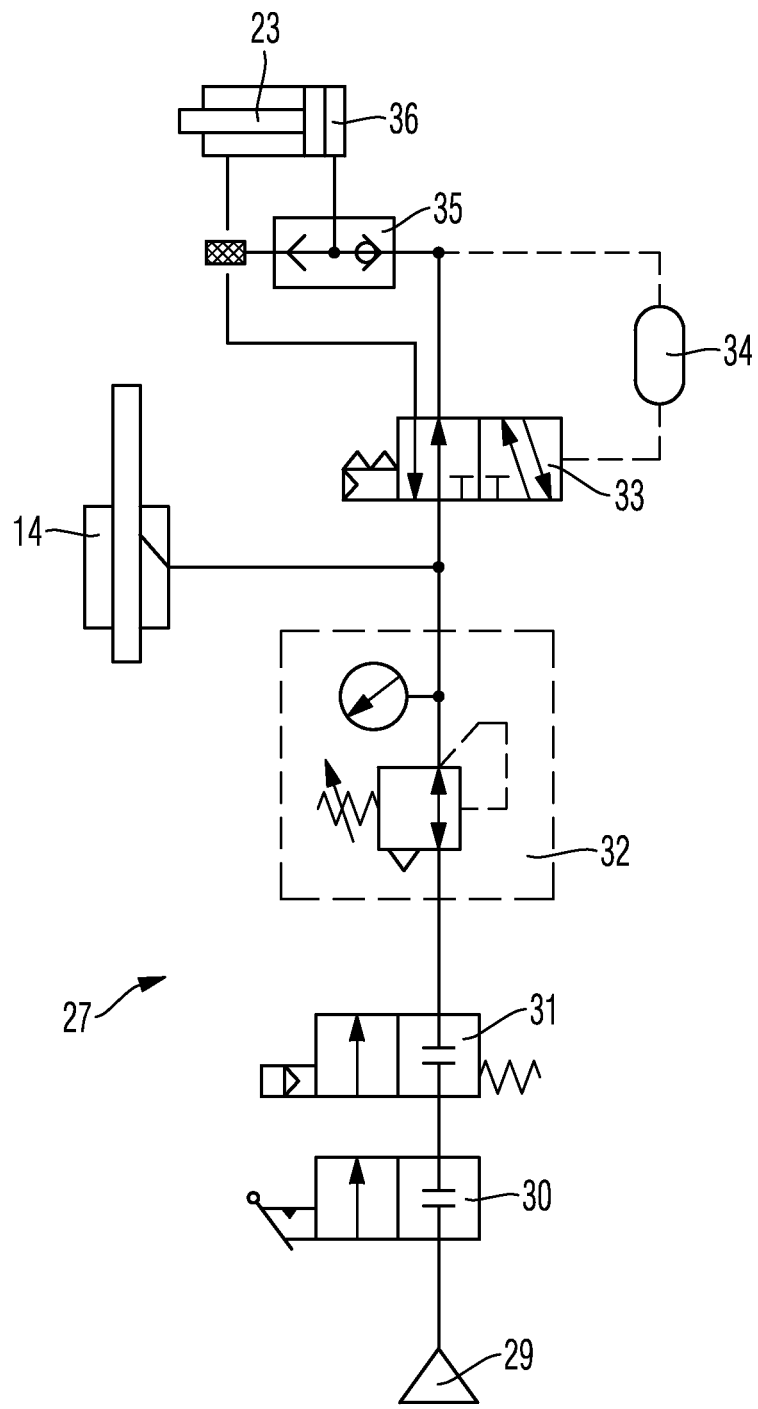
FIG. 2 shows a circuit diagram for illustrating the driving of the apparatus for acting on the receptacle and driving of the suction apparatus.

A switching arrangement for the substantially pneumatic operation of the device 1 is illustrated in the circuit diagram according to FIG. 2.

Shown is a compressed air source 29 having a pressure level of, for instance, 6 bar, a 2/2-way manual shutoff valve 30, a 2/2-way electromagnetic valve 31, a pressure regulator with manometer 32, the suction lance 14, a 5/2-way valve 33 (with control air), a pressure tank 34, a rapid action vent valve 35, and a pneumatic cylinder 36 of the lifting unit 22, wherein the piston rod of the pneumatic cylinder 36 forms the lifting rod 23 of the lifting unit 22. Illustrated is that, when the valves 30 and 31 are in an open position, the suction lance 14 is supplied with compressed air for the suction and conveyance of the granulate 10 and, depending on the switch position of the valve 33, the pneumatic cylinder 36 is acted on in such a way that the lifting rod 23, and thus the plate 21, is raised or lowered.

That which is claimed is:

1. A device for conveying a fine-particle medium, comprising:
    a flexible receptacle for receiving the medium;
    a container comprising a bottom part defining an interior and a lid mounted pivotally on the bottom part for clamping the receptacle in the region of an upper end facing away from a base of the receptacle between the bottom part and the lid with the receptacle disposed within the interior of the bottom part; and
    a suction apparatus, inserted from above the container into the receptacle, for conveying the medium out of the receptacle;
    wherein beneath the receptacle in the bottom part of the container is arranged a lifting unit operable for contacting the base of the receptacle and thereby deforming at least a portion of the receptacle.

2. The device according to claim 1, wherein the lifting unit periodically contacts the base to deform the receptacle.

3. The device according to claim 1, wherein the lifting unit percussively contacts the base to deform the receptacle.

4. The device according to claim 1, wherein the lifting unit comprises a plate for moving the base of the receptacle.

5. The device according to claim 4, wherein the plate of the lifting unit moves back and forth together with the base of the receptacle.

6. The device according to claim 4, wherein the plate of the lifting unit moves away from the receptacle after having contacted the receptacle faster than an independent lowering of the base of the receptacle due to the inertia of a weight force acting on the receptacle.

7. The device according to claim 4, wherein the plate of the lifting unit is movable back and forth, and wherein the plate is adapted to be periodically brought into contact with the base of the receptacle.

8. The device according to claim 4, wherein the the plate of the lifting unit is movable back and forth, and wherein the receptacle rests on the plate.

9. The device according to claim 1, wherein the receptacle has side walls and wherein at least a part of the receptacle is flexibly configured in at least the region of the side walls of the receptacle.

10. The device according to claim 1, wherein the receptacle is made of at least one of a fabric, a cloth and a plastic.

11. The device according to claim 1, wherein the lid of the container has an opening and wherein a lance of the suction apparatus passes axially through the opening in the lid.

12. The device according to claim 1, wherein the lifting unit is configured to be operated pneumatically.

13. The device according to claim 1, wherein the lifting unit is configured to be operated electrically.

* * * * *